Feb. 8, 1966  J. C. MAGINN, JR  3,233,982
APPARATUS FOR MANUFACTURE OF FERRIC CHLORIDE
Filed May 2, 1962  2 Sheets-Sheet 1
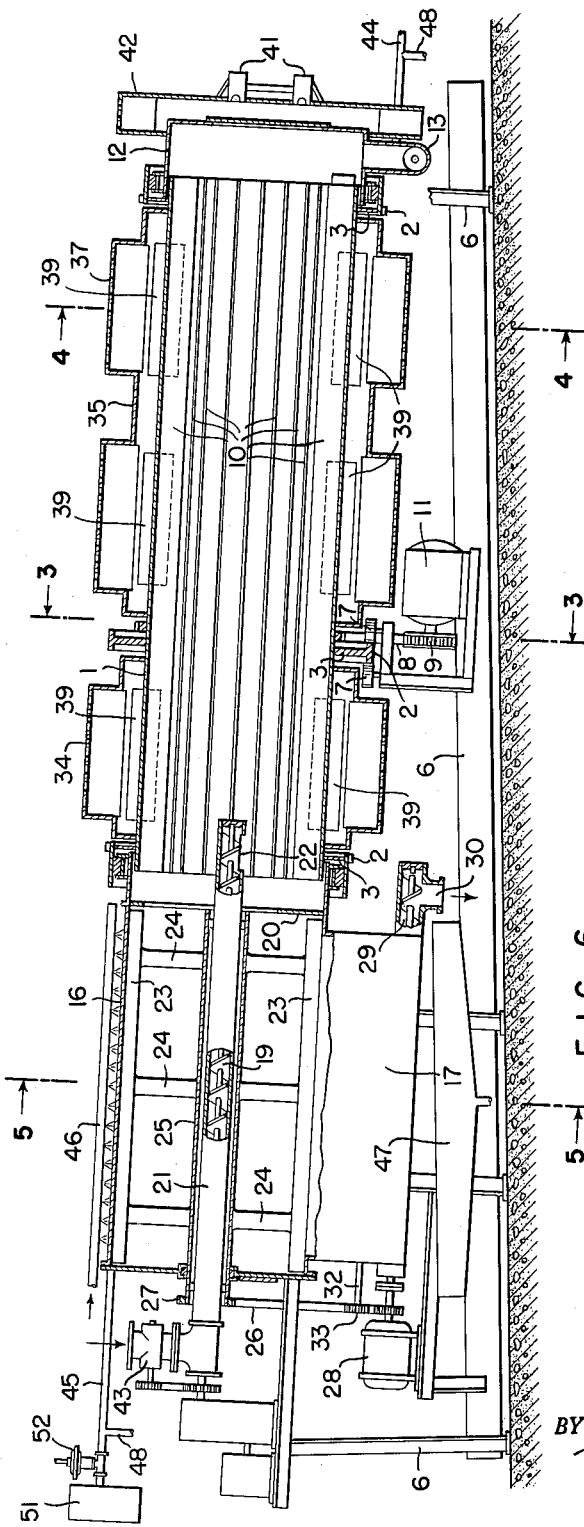
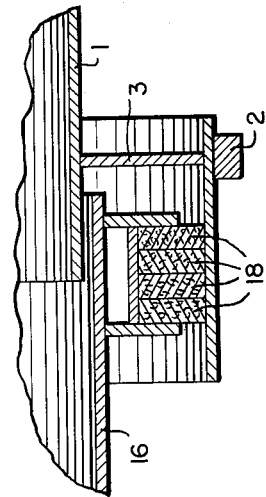
INVENTOR.
JOSEPH C. MAGINN JR.
BY
ATTORNEY.

Feb. 8, 1966     J. C. MAGINN, JR     3,233,982
APPARATUS FOR MANUFACTURE OF FERRIC CHLORIDE
Filed May 2, 1962     2 Sheets-Sheet 2

*INVENTOR.*
JOSEPH C. MAGINN JR.
BY
ATTORNEY.

United States Patent Office 3,233,982
Patented Feb. 8, 1966

3,233,982
APPARATUS FOR MANUFACTURE OF
FERRIC CHLORIDE
Joseph Clifford Maginn, Jr., Newtown Square, Pa.,
assignor to Selas Corporation of America, a corporation of Pennsylvania
Filed May 2, 1962, Ser. No. 191,852
4 Claims. (Cl. 23—286)

The present invention relates to the production of anhydrous ferric chloride, and more particularly to a piece of apparatus in which such material is made commercially.

Ferric chloride is the reaction product of iron and chlorine, which reaction is exothermic and produces the product as a vapor that is later condensed. Ordinarily, the iron can be utilized in the form of borings or filings, and the chlorine is a commercially pure gas.

It is an object of the invention to provide apparatus by which ferric chloride can be made on a continuous basis.

It is a further object of the invention to provide apparatus in which iron and chlorine can be continually brought into contact with each other without the presence of moisture and the resulting product condensed in a pure form.

An additional object of the invention is to provide a piece of apparatus in which a chemical reaction can be carried out continuously.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a section through the apparatus,

Figure 2:
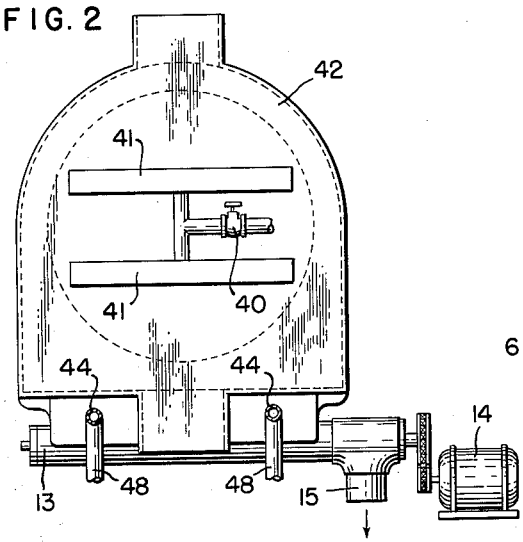
FIG. 2 is a view looking from the right of FIG. 1.
Figure 3:
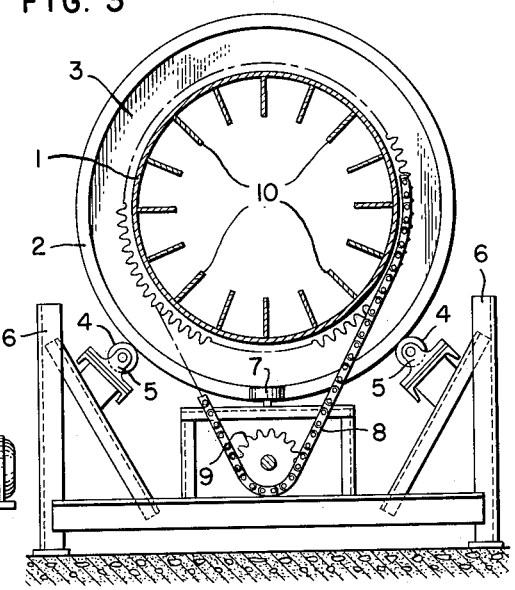
Figure 4:
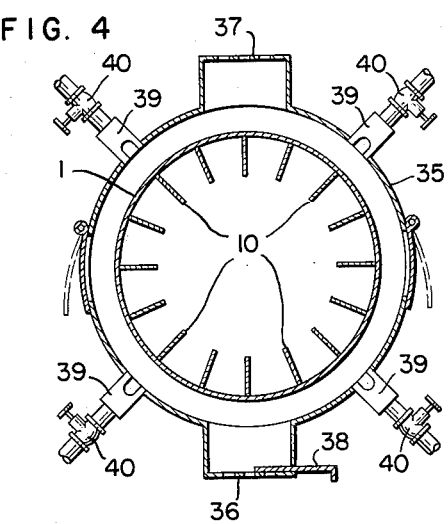
Figure 5:
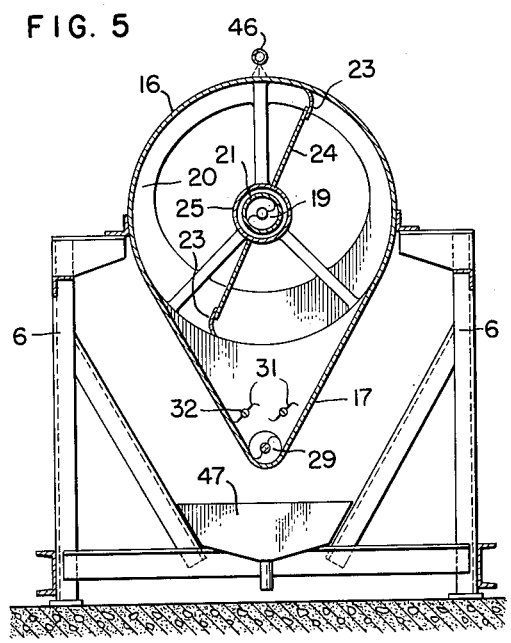

FIGS. 3, 4 and 5 are section views taken respectively on lines 3—3, 4—4 and 5—5 of FIG. 1, and FIG. 6 is an enlarged view of one of the seals.

Referring to the drawings, there is shown a reaction vessel 1 which is in the form of a cylindrical metal drum that is rotated around its axis, which is inclined slightly to the horizontal. The vessel is supported for rotation on a plurality of axially spaced flanges 2 that extend from the edge of radial webs 3, which project from the exterior of the drum. As seen in FIG. 3, each of the flanges rests upon rollers 4 that are supported in bearings 5 which, in turn, are mounted at suitable locations on a frame 6 that supports the entire apparatus. The drum is kept from moving in an axial direction by means of rollers 7 bearing against the edges of the flange 2 at the center of the drum. This mounting permits the ends of the drum to expand with changes in its temperature. The drum is rotated by means of a chain 8 encircling one of the flanges that is, in turn, driven by a sprocket 9 from a motor 11. A plurality of axially extending fins 10 project radially into the drum.

The lower or right end of the drum is closed by a hood 12 having a cylindrical portion that telescopes over the end of the drum. The lower portion of this hood is provided with a transversely extending screw conveyor 13, that is driven by a motor 14, to remove through an outlet 15 material falling into the hood.

The upper end of the vessel is closed by parts forming a condenser, which include a shell 16 that is telescoped over the upper end of the drum and which extends downwardly with the sides converging as shown at 17 in FIG. 5. A plate 20, having an opening therein through which the product can pass, extends across the entrance of shell 16 so that the condenser is, in effect, separated from the vessel. The overlapping portions of each end of the drum are sealed respectively at hood 12 and condenser 16 by means of seals such as the one shown more in detail in FIG. 6. These seals consist of strips of heat and chemical resisting material 18 held on the stationary part and bearing frictionally against the inner surface of an extension of flange 2, thereby preventing any leakage between the stationary and rotating parts. It will be noted that the construction of the seal permits the drum to expand lengthwise with changes in its temperature.

Material is fed into the upper end of vessel 1 by means of a screw conveyor 19 that is located within a tube 21 extending axially through the condenser portion. The tube is provided with an outlet opening 22 immediately within the upper end of the drum.

During the operation of the apparatus, that will be explained in detail below, ferric chloride vapor is condensed on the surface of the shell 16 and removed from this surface by means of scraper blades 23 that are supported on arms 24 extending radially from a sleeve 25 surrounding and journaled for rotation on tube 21. This sleeve and the scraper blades are rotated by a chain 26 running over a sprocket 27 on the end of the sleeve, with the chain being driven by a motor 28. This motor also drives a screw conveyor 29 to remove material from the bottom portion 17 of the shell through an outlet 30. There are also provided in the lower portion 17 of the shell a pair of breaker bars 31 that are mounted on shafts 32 which have sprockets 33 on them that are driven by chain 26.

During the operation of the apparatus, a certain temperature has to be maintained within the reactor vessel 1. When the apparatus is started up, the drum has to be heated, but the reaction is exothermic so that later on, when the reaction is continuing, the drum must be cooled to maintain it within the proper temperature range. For this purpose a pair of housings 34 and 35 surround the vessel 1. Each of these housings, as shown in FIG. 4, is provided with a bottom opening 36 and a top opening 37 through which air can flow around the vessel. If desired, the intake opening 36 can be adjusted by means of a damper 38. Located at spaced points in the housing and directed toward the exterior of the vessel are a plurality of elongated burners 39 that are used, when necessary, in order to heat the vessel. Additional burners 41 are located in a shield that extends over the end of hood 12 in order to heat this hood. Fuel mixture to each burner is controlled by a valve 40.

Material to be reacted, which in the normal use of this apparatus would be iron chips or filings, is suplied through a star feeder 43 of conventional design to the conveyor 19. The chlorine which is used in the reaction is supplied countercurrent to the flow of the iron chips through a pipe 44 into hood 12 at one or more locations in the lower portion thereof. There is also provided a chlorine outlet 45 through which unused chlorine can be recirculated through a pipe 48 back to the inlet line 44. From time to time it may be necessary to draw off part of the gas in the system and to vent other gases that are introduced in the vessel. To this end there is provided a vent line that extends from outlet 45 to a washer 51 for cleaning the gas before it is discharged. A manual or pressure operated valve 52 is located in this line. In addition, the condenser end of the apparatus, which includes the shell 16, is normally cooled by water flowing over its surface. To this end there is provided a spray pipe 46 to discharge water over the top of shell 16, which water runs around the shell and is collected in a drain pan 47.

The operation of the apparatus in the manufacture of ferric chloride will now be described. Broadly speaking, iron will react with chlorine to produce ferric chloride. This reaction is exothermic, and the chloride is produced in vapor form. The vapor is then condensed to form ferric chloride crystals that are collected as the product. Ferric chloride will vaporize at about 600° F., and if the temperature is raised above about 1000° F., it will change to ferrous chloride. Therefore, the reaction vessel is preferably kept at a temperature of between about 600° F. and 850° F. for best results.

Iron, preferably in the form of clean, dry borings, is supplied through feeder 43 to conveyor 19 by means of which it is moved into the reaction vessel and dropped into the upper end thereof. Fins 10 agitate the material as it travels through the vessel due to the rotation thereof. Chlorine is introduced through the pair of inlets in hood 12 from pipe 44, to flow countercurrent over the iron with the reaction taking place throughout the length of the vessel.

Prior to starting the apparatus, burners 39 and 41 are ignited to heat the vessel to at least 600° F., at which temperature ferric chloride will vaporize, and preferably not over 850° F. As the reaction gets under way, less external heat is needed so that the burners, or some of them, can be shut off. Cooling of the vessel can be accomplished by air flow induced by convection between the vessel and hoods 34 and 35. Control of the burners individually or in groups at various points around and along the vessel can be accomplished by adjusting valves 40 either manually or automatically by any conventional temperature control system.

The residue from the reaction, consisting of unreacted iron, impurities and dirt, flows from the lower end of the vessel on to screw conveyor 13 in the bottom of hood 12, by which it is discharged from outlet 15.

The ferric chloride vapor produced by the reaction flows upwardly from vessel 1 into shell 16 where it is cooled and condensed into crystals. Those crystals which condense on the wall are removed by scraper blades 23 and fall into conveyor 29. Since the crystals may have a tendency to bridge over conveyor 29, the pair of breaker bars 31 is provided to prevent this from happening. Conveyor 29 continuously removes the product through outlet 30 into a suitable receptacle.

The excess chlorine is discharged from shell 16 through outlet 45 to be recirculated through pipe 48 to inlet 44. From time to time various gases other than chlorine, such as air introduced with the filings, accumulates in the system and should be removed. When this become necessary, valve 52 is opened so that some of the gas can be discharged into cleaner 51 where it is washed to remove the chlorine before being discharged into the atmosphere. Valve 52 serves another purpose in that, if the pressure in the system becomes too high, surplus gas will be vented into the cleaner.

Since chlorine is toxic, it is necessary that all the seals between the rotating and stationary parts of the apparatus be gas tight. In addition, the connections between outlets 12 and 30 and the receptacles for the residue and the product, respectively, must be carefully sealed. Another reason for sealing the entire apparatus and for using dry borings is to prevent the introduction of moisture to the system. This reduces the chances of corrosion, and insures that the product will be anhydrous ferric chloride.

From the above description, it will be seen that there is provided apparatus in which a solid and a gas can be brought into intimate contact for a reaction to take place. The arrangement is such that the reaction can take place throughout the entire length of the vessel with fresh chlorine being introduced at the point where the iron charge density is lowest, and the concentration of the iron in the solids is lowest. This also tends to keep the heat developed by the reaction constant from one end of the vessel to the other. As shown, the heating and cooling provisions along the vessel can be adjusted individually at different portions thereof. In this manner, the vessel is divided into what amounts to a plurality of zones of control. In this fashion, the entire reactor vessel can be maintained at a temperature where all of the ferric chloride produced will remain in vapor form until it is condensed in the left end of the apparatus for removal. Thus, the loss of the product in the apparatus and with the residue is substantially zero.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. Apparatus of the class described including in combination a cylindrical reaction vessel having open ends, means to mount said vessel for rotation around its axis with one end slightly higher than the other, means to rotate said vessel, a stationary hood into which the lower end of said vessel extends to close said lower end, a stationary shell substantially the same diameter as said vessel into which the upper end of said vessel extends, said shell forming a continuation of said vessel, material feeding means extending in an axial direction through said shell into said vessel, means to introduce a reactant into said vessel through said hood, a housing surrounding a portion of said vessel between its ends, heating means to apply heat to the exterior of said vessel in said housing, and said housing being provided with openings through which cooling air can be circulated between said housing and said vessel.

2. The combination of claim 1 including conveyor means in said hood to remove material therefrom as it enters said hood from said vessel.

3. The combination of claim 1 including a scraper in said shell to scrape the inside thereof, means to mount said scraper for rotation around said material feeding means, means to rotate said scraper, and means at the bottom of said shell to remove material scraped from the inside thereof.

4. Apparatus of the class described including a cylindrical reaction vessel having open ends, means to mount said vessel for rotation around its exis with the axis at a slight angle to the horizontal, means to rotate said vessel, stationary means surrounding one end to close said end of said vessel, a seal between said stationary means and vessel, a stationary shell receiving the other end of said vessel and extending therefrom, a seal between said shell and vessel, means to supply a gas to said vessel through said stationary means, conveying means operative to supply a solid material to said vessel extending through said shell into said vessel, scrapers operative to clean material from the inside of said shell, means to remove material from the bottom of said shell, means to direct cooling air around said vessel and means to heat said vessel.

References Cited by the Examiner

UNITED STATES PATENTS

| | | | |
|---|---|---|---|
| 1,406,595 | 2/1922 | Wescott | 75—112 |
| 1,430,454 | 9/1922 | Low | 23—87 X |
| 1,642,756 | 9/1927 | Wedekind | 23—264 |
| 1,814,392 | 7/1931 | Low et al. | 23—87 |
| 2,739,801 | 3/1956 | Rankin | 263—33 |
| 3,068,091 | 12/1962 | Kirkland | 263—32 X |

MORRIS O. WOLK, *Primary Examiner.*

JAMES H. TAYMAN, JR., *Examiner.*